Feb. 14, 1961 T. W. WILLEMSE 2,971,251
SEMI-CONDUCTIVE DEVICE
Filed June 20, 1955
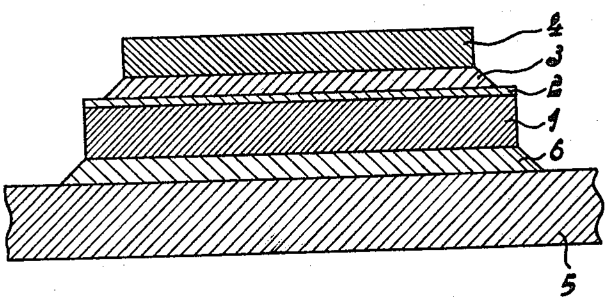
INVENTOR
THEO WILLEM WILLEMSE
BY [signature]
AGENT United States Patent Office 2,971,251

Patented Feb. 14, 1961

2,971,251

SEMI-CONDUCTIVE DEVICE

Theo Willem Willemse, Delft, Netherlands, assignor, by mesne assignments, to North American Philips Company, Inc., New York, N.Y., a corporation of Delaware Filed June 20, 1955, Ser. No. 516,690

Claims priority, application Netherlands July 1, 1954

9 Claims. (Cl. 29—195)

This invention relates to semi-conductive devices, such as crystal diodes or transistors, wherein the semi-conductive body is soldered to a carrier or supporting plate.

It has been realized that a drawback of the known devices involves possible breakage of the body, due among other things to its brittleness and to the fact that its coefficient of expansion differs from that of the material of the carrier plate. Consequently, it has been suggested for germanium semiconductive bodies that the carrier plate should consist of an alloy of 54% of iron, 29% of nickel and 17% of cobalt, known under the trademark "Fernico." The linear coefficient of expansion of this alloy is $4\times10^{-6}$ in the hard state and $6\times10^{-6}$ in the annealed state, which values approach that of germanium, which is $4.8\times10^{-6}$.

However, still further requirements are imposed upon the material for the carrier plate. To obtain satisfactory cooling, a high thermal conductivity for the carrier plate is desirable. Furthermore, the material must be resistant to the etching liquids usually employed for cleaning the semi-conductive body after it is soldered to the carrier plate. The above-mentioned iron, nickel, cobalt alloy does not satisfy these additional requirements.

The chief object of the invention is to provide a carrier plate of a composition which fulfills all of the above-noted requirements.

According to the invention, the carrier plate of the semiconductive device is constituted of one of the non-radio-active transition metals of the sixth group of the periodic system. These metals and their coefficients of expansion are:

| | |
|---|---|
| Chromium | $6.8\times10^{-6}$ |
| Molybdenum | $4.9\times10^{-6}$ |
| Tungsten | $4.3\times10^{-6}$ |

The coefficients of expansion of these metals, it will be noted, are values such that the possibility of breakage of the semi-conductors germanium and silicon, which are most commonly employed in semi-conductive devices, is greatly reduced. Molybdenum and tungsten are particularly suitable for this purpose by reason of their high thermal conductivity, whereby the heat produced in the semi-conductive body during passage of current therethrough is dissipated rapidly.

These metals are also resistant to many of the etching baths used in connection with semi-conductive devices, for example, those of the following compositions:

(A)

50 ccs. of HF (48%)
50 ccs. of $HNO_3$ (69.2%)
20 ccs. of $H_2O$ (B)

30 ccs. of $HNO_3$ (69.2%)
9 ccs. of $CH_3COOH$ (99.8%)
18 ccs. of HF (48%)
0.16 cc. of Br Furthermore, these metals have a high mechanical strength, so that when the semi-conductive body is soldered by means of a carrier plate constituted of one of said metals to another plate, for example, a copper cooling plate, the deformation of the carrier plate is small as compared to the deformation of the copper cooling plate.

In one preferred embodiment, the carrier plate, constituted of one of the metals, is porous and the pores are filled with a different metal. Such a porous plate may be obtained by sintering metal powder. In this way, the coefficients of expansion of the semi-conductive body and the carrier plate may be matched, and the thermal conductivity of the latter improved by variation of the metal of the carrier plate, the volume of the pores, and the metal with which the pores are filled. A suitable metal for filling the pores is silver. In order to enhance the flowing capacity of the latter, several tenths of a percent of germanium or silicon may be added thereto. Other serviceable metals are gold and copper. These latter metals are the non-radioactive rare metals and semi-rare metals of the first group of the periodic system.

The invention will now be described with reference to the accompanying drawing wherein the sole figure shows part of a diode on an enlarged scale.

In the drawing, there is provided a carrier plate 1, which in accordance with the invention may be, for example, of molybdenum. The plate 1 is covered with a thin gold layer 2, which serves to improve the adhesion of a thin layer of solder 3, by means of which a semi-conductive body 4, for example, a germanium or a silicon monocrystal, is secured. The gold layer 2 may be provided by electrolytic means. The solder 3 used may be tin to which donors or acceptors may be added in the well-known manner. The solder may produce an ohmic contact, the rectifying contact, not shown, being provided on the upper surface of the semi-conductive body. However in another embodiment, the solder may produce a rectifying contact by means of the alloying process, which is well known to the art. In this case an ohmic contact should be applied on the upper surface of the semi-conductive body.

The carrier plate 1 in turn is soldered 6 to a cooling plate 5, which is made, for example, of copper, aluminum, nickel or iron. The soldering agent 6 may be silver. If the bottomside of the carrier plate 1 is gold-plated, the number of different soldering agents that may be employed is much increased.

In accordance with a further embodiment of the invention, a porous carrier plate 1 is provided, which may consist, for example, of tungsten or molybdenum having a pore volume of about 10%. When the pores are filled with silver or a similar metal that can be used as solder, the securing of the carrier plate to the cooling plate may advantageously be effected simultaneously. The coefficient of expansion of such a silver-impregnated carrier plate is $5.8\times10^{-6}$, and is thus matched satisfactorily to that of germanium, which is about $5.6\times10^{-6}$ at the operating temperature.

While I have described my invention in connection with specific embodiments and applications, other modifications thereof will be readily apparent to those skilled in this art without departing from the spirit and scope of the invention as defined in the appended claims.

What is claimed is:

1. A semi-conductor electrical device with improved heat dissipating abilities comprising a semi-conductive body selected from the group consisting of germanium and silicon, a plate-like support member for said semi-conductive body consisting essentially of a metal selected from the group consisting of chromium, molybdenum and tungsten, a gold layer bonded to a surface of said support member, and solder means securing said semi-conductive body over a substantial surface area to said support member at said gold layer.

2. A device as set forth in claim 1 wherein the solder means is tin solder.

3. A semi-conductor electrical device with improved heat dissipating abilities comprising a semi-conductive body selected from the group consisting of germanium and silicon, a support member for said semi-conductive body comprising a porous body consisting essentially of a metal selected from the group consisting of molybdenum and tungsten with the pores filled with a metal selected from the group consisting of silver, gold and copper, said support member having an overall expansion coefficient matching that of the semi-conductive body, and solder means securing said semi-conductive body over a substantial surface area to said support member.

4. A device as set forth in claim 3 wherein the support member has a pore volume of about 10%.

5. A semi-conductor electrical device with improved heat dissipating abilities comprising a semi-conductive body selected from the group consisting of germanium and silicon, a support member for said semi-conductive body consisting essentially of molybdenum, a gold layer bonded to a surface of said support member, and tin solder securing said semi-conductive body over a substantial surface area to said support member at said gold layer.

6. A semi-conductor electrical device with improved heat dissipating abilities comprising a wafer-like, monocrystalline, semi-conductive body selected from the group consisting of germanium and silicon, a support member for said semi-conductive body comprising a plate-like porous body consisting essentially of a metal selected from the group consisting of molybdenum and tungsten with the pores filled with a metal selected from the group consisting of silver, gold and copper, said support member having an overall expansion coefficient matching that of the semi-conductive body, first solder means securing said semi-conductive body over a substantial surface area to said support member, a cooling plate, and second solder means securing said support member over a substantial surface area to said cooling plate.

7. A semi-conductor electrical device with improved heat dissipating abilities comprising a wafer-like, monocrystalline, semi-conductive body selected from the group consisting of germanium and silicon, a plate-like support member for said semi-conductive body consisting essentially of a metal selected from the group consisting of molybdenum and tungsten, a gold layer bonded to a surface of said support member, first solder means securing said semi-conductive body over a substantial surface area to said support member at said gold layer, a cooling plate, and second solder means securing said support member over a substantial surface area to said cooling plate.

8. A semi-conductor electrical device with improved heat dissipating abilities comprising a semi-conductive single crystal body selected from the group consisting of germanium and silicon, a plate-like support member for said semi-conductive body consisting essentially of tungsten, first solder means securing said semi-conductive body over a substantial surface area to said support member, a cooling plate, and second solder means securing said support member over a substantial surface area to said cooling plate.

9. A device as set forth in claim 8, wherein the cooling plate is of copper.

References Cited in the file of this patent

UNITED STATES PATENTS

| | | |
|---|---|---|
| 2,391,456 | Hensel | Dec. 25, 1945 |
| 2,441,603 | Storks | May 18, 1948 |
| 2,525,565 | Sorg | Oct. 10, 1950 |
| 2,555,001 | Ohl | May 29, 1951 |
| 2,690,409 | Wainer | Sept. 28, 1954 |
| 2,763,822 | Frola | Sept. 18, 1956 |